United States Patent [19]

Weiss

[11] 4,249,567
[45] Feb. 10, 1981

[54] CHECK-VALVE CONSTRUCTION

[75] Inventor: Paul D. Weiss, Eastlake, Ohio

[73] Assignee: Transamerica DeLaval Inc., Princeton, N.J.

[21] Appl. No.: 81,132

[22] Filed: Oct. 2, 1979

[51] Int. Cl.³ .............................................. F16K 15/03
[52] U.S. Cl. .................................. 137/512; 137/512.1; 137/527; 251/337
[58] Field of Search ...................... 137/512, 512.1, 527, 137/527.2, 527.4, 527.6; 251/337

[56] References Cited

U.S. PATENT DOCUMENTS

| 586,618 | 7/1897 | Noll | 137/512 X |
|---|---|---|---|
| 2,603,450 | 7/1952 | Long | 137/527.4 |
| 2,877,792 | 3/1959 | Tybus | 137/513.3 X |
| 3,509,908 | 5/1970 | Latham et al. | 137/527 |
| 3,538,946 | 11/1970 | Hilsheimer | 137/512.1 |
| 3,640,306 | 2/1972 | Vogt | 137/527 X |
| 3,678,958 | 7/1972 | Satterwhite et al. | 137/512.5 X |
| 4,079,751 | 3/1978 | Partridge et al. | 137/512.1 X |
| 4,196,745 | 4/1980 | Schutzer | 137/512.1 |

Primary Examiner—William R. Cline
Attorney, Agent, or Firm—Hopgood, Calimafde, Kalil, Blaustein & Lieberman

[57] ABSTRACT

The invention contemplates a combined closure spring and upstop having particular application to check valves having multiple valve members. The invention is illustrated by one embodiment involving two valve members hinged on a single axis oriented diametrically of the valve-flow passage, and by another embodiment involving more than two valve members hinged on separate axes oriented tangentially of the valve-flow passage.

12 Claims, 5 Drawing Figures

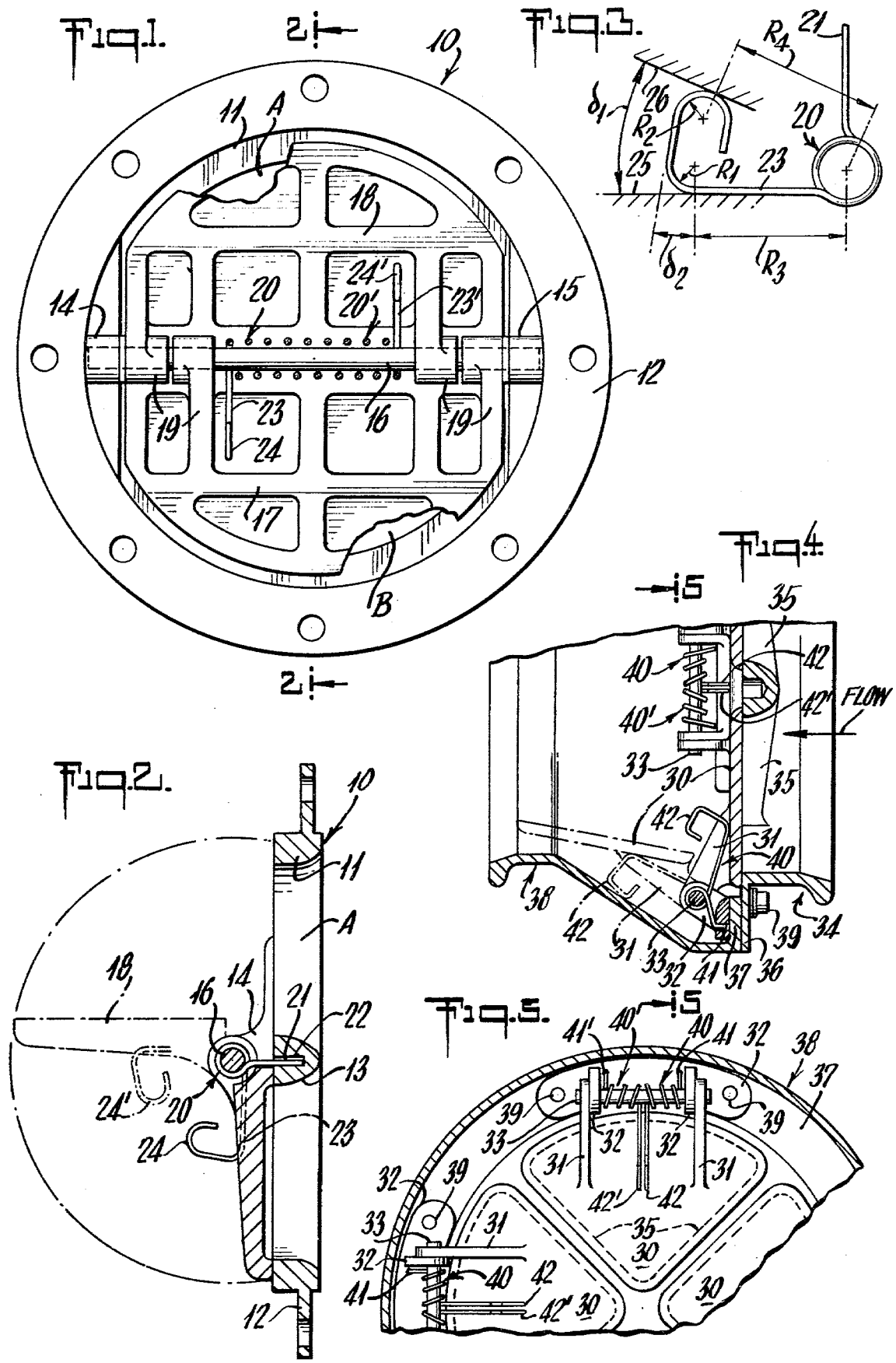

CHECK-VALVE CONSTRUCTION

BACKGROUND OF THE INVENTION

The invention relates to check-valves of the variety in which multiple like valve members (petals) are hinged for independent coaction with the respective valve-seat openings in a seating plane; in the case of a double-petal valve, said openings are defined by a seat post which extends diametrically across the bore of the valve body. Check valves of this character are illustratively described in U.S. Pat. Nos. 2,877,792 (Tybus), No. 3,538,946 (Hilsheimer), No. 3,678,958 (Satterwhite, et al.), and No. 4,079,751 (Partridge, et al.).

In the foregoing patents and in all other similar check valves known to me, the valve body includes or carries a fixed stop against which the valve members abut to determine their full-open position. For certain applications, the provision of such a stop entails complexity of body construction and mechanical shock associated with attainment of the full-open position of the valve. Such shock is aggravated under conditions of frequent and intermittent demand for full-flow use of the valve.

SUMMARY OF THE INVENTION

It is an object of the invention to provide an improved check-valve construction of the character indicated, featuring simplicity of construction and maintenance, and improved performance, as compared to existing constructions.

A specific object is to achieve the above object with a construction having inherently improved flowaccommodating properties, for a valve of given size.

Another specific object is to provide an improved up-stop function in a valve of the character indicated, without reliance upon special formation of or assembly to the body of the valve.

A further specific object is to achieve the above objects with the additional provision of resiliently snubbed determination of the full-open condition of the valve.

In a double-petal application, the invention achieves the foregoing and other objects and features by providing spring means on at least one of the valve members in such position as to resiliently engage the other valve member when in full-open position, thus cushioning the achievement of full-open position of both valve members, without reliance on valve body structure to provide any up-stop function. Preferably, the spring means for achieving this function is an integral formation on the same spring means as is used to normally urge the valve members in the valve-closing direction.

DESCRIPTION OF PREFERRED EMBODIMENTS

Preferred embodiments of the invention will be described in connection with the accompanying drawings, in which:

FIG. 1 is a view in elevation of a check valve of the invention, as viewed from the downstream end;

FIG. 2 is a longitudinal sectional view, taken at 2—2 in FIG. 1, showing one half of the valve closed, and the other half in phantom for its open position;

FIG. 3 is a view in elevation of a spring component of the structure of FIG. 1;

FIG. 4 is a fragmentary longitudinal sectional view of another type of check valve incorporating the spring feature of the invention; and FIG. 5 is a sectional view taken at 5—5 in FIG. 4.

In FIGS. 1 to 3, the invention is shown in application to a check valve comprising a body 10 having a cylindrical annular shell 11 with a thin circumferential mounting flange 12 and with a cylindrical bore which is divided into two like generally semi-cylindrical seat openings or ports A-B, by means of a seat post 13 which extends diametrically across the bore and is preferably integral with the shell 11. Also integral with shell 11 are diametrically opposed bearing mounts 14-15, for location of the diametrically opposite ends of a hinge pintel 16, on an alignment parallel to seat post 13 and at a downstream offset from the valve-seating plane, the latter being established by the otherwise flat downstream end of body shell 11. Two like generally semi-circular valve members 17-18 are connected (via their hinge arms 19) by pintel 16 to the body shell, for independent articulation about the hinge axis; and in the closed or valve-checking position, valve members 17-18 will be understood to peripherally continuously lap all seating surfaces of shell 11 and seat post 13 in the seating plane.

In the form of FIGS. 1 to 3, separate spring means 20-20' are employed to normally urge the respective valve members 17-18 in the valve-closing direction. These springs are duplicates of each other, so that the spring 20 of FIG. 3 is illustrative of either one of them, primed notation being used for the corresponding parts of spring 20'. At one end of the coil of spring 20, a first arm 21 extends into a central local bore 22 in seat post 13, for frame-referencing purposes, the pintel 16 extending through the coil of spring 20; and a second arm 23 at the other end of the coil extends along the back of valve member 17 to urge the same in the valve-closing direction. A similar action applies for spring 21, frame-referenced at 22 and urging valve member 18 in the valve-closing direction, it being noted that the coiled parts of springs 20-21 are retained via bore 22 at diametrically opposite symmetrical locations on pintel 16.

In accordance with the invention, further spring means is provided on the back or downstream side of at least one of the valve members 17-18 in such position and orientation as to resiliently engage the back of the other valve member at the full-open position of these members. Such further spring means, in FIGS. 1 to 3, takes the form of a snubber formation 24 in the shape of an integral hook or loop extending at an angular offset $\delta_1$ with respect to the arm 23 of spring 20, the offset $\delta_1$ in FIG. 3 being shown between a first plane 25 (representing constant contact with the back of valve member 17) and a second plane 26 (representing intermittent abutment with the back of valve member 18), to depict the full-open relation of valve members, as determined by spring 20. Preferably, the radius $R_1$ of curvature at juncture of hook 24 to arm 23 matches the radius $R_2$ of curvature of hook 24, and the complement $\delta_2$ of the inclination of hook 24 to the arm is $\delta_1$, whereby the maximum radius $R_3$ of arm (23) contact with valve member 17 substantially equals the radius $R_4$ of hook (24) contact with valve member 18. This being the case for spring 20 and its hook formation 24, it is also the diametrically opposite case for spring 20' and its hook formation 24', thus assuring symmetry of snubbed valve-member up-stop action upon achievement of the full-open condition of the valve.

The embodiment of FIGS. 4 and 5 represents application of the up-stop spring feature of the invention to a different form of multi-petal check valve, which happens to employ plural angularly sequential valve members or petals 30 which are of sector shape and which are tangentially hinged to surrounding frame structure via radially outward hinge arms 31. To accommodate the full-open swing of petals 30 plus hinge brackets 32 for arms 31 and their connecting pintel 33, an inlet ring 34 with integral seat-post formations 35 has a radially outward flange 36 which is lapped by the adjacent radially inward flange 37 of an outlet ring 38, the two rings 34–38 being secured at their flanges by bolts 39 which also serve to mount the brackets 32 to flange 37. A first spring 40 has frame reference at an anchoring aperture 41 in the base of bracket 32, thus also axially locating spring 40 and assuring the central action of the petal-operating other end arm of spring 40; as in the case of FIGS. 1 to 3, the petal-engaging end arm of spring 40 has a hook-shaped offset 42, poised for up-stop action upon the inner wall surface of the outlet ring 38. It will be understood that, for many applications the single spring 40 will suffice, in that up-stop action and petal-seating action are generally central and symmetrical with respect to the spaced points of hinge support. However, for total symmetry, I show an additional spring 40' which is the mirror image of spring 40 and which is carried on the remaining span of pintel 33; spring 40' is frame-referenced at one end in bracket aperture 41' and has an up-stop hook formation 42' at its centrally located other end, in mirror-image relation to spring 40 about the center of symmetry of petal 30.

The described embodiments will be seen to meet all stated objects with structure of elemental simplicity and lending itself to application in either a diametrically or a tangentially oriented body suspension of the hinge. In all cases, the full-open position of valve members is snubbed and effectively stopped, snub forces being sustained by each valve member with mirror-image symmetry, about the central axis of symmetry of the valve member.

While the invention has been described in detail for the preferred forms shown, it will be understood that modifications may be made without departing from the claimed scope of the invention. For example, by eliminating the mounting flange 12, to leave body shell 11 with a suitably grooved outer cylindrical profile, the complete check valve of the FIG. 1 variety may be installed and retained in the bore of a pipe, conduit or other suitably grooved fitting, as in the manner disclosed in detail in copending application Ser. No. 27,846, filed Apr. 6, 1979.

What is claimed is:

1. A check-valve assembly, comprising an annular body with a fluid-flow passage bore extending therethrough between upstream and downstream ends of said body, said valve body having valve-seat formations establishing plural valve-seat regions at a single radial plane of valve-seating action, a plurality of valve members corresponding to the number of valve-seat regions with each valve member having a valve-closing position at a different one of said valve-seat regions, each valve member having two spaced hinge arms pintel-connected to said body, and a separate frame-referenced pintel-supported coil spring for each valve member, each said coil spring having a body referenced arm at one end and a valve-member biasing arm at the other end, said biasing arm urging its associated valve member to valve-closing position, and said biasing arm including at its outer end an integrally formed up-stop contact portion configured and positioned for yielding abutment to provide a cushioning effect in the valve open position.

2. The check-valve assembly of claim 1, in which pintel connection of said arms to said body is outboard of said arms, each said coil spring being so axially located between said arms and by its body-referenced end that said up-stop formations provide up-stop contacting reaction forces that are symmetrical with respect to the central plane of symmetry of the associated valve members.

3. The check-valve assembly of claim 1, in which said valve-seat formations include a diametrically extending seat post establishing two valve-seat regions, said valve members being generally semicircular and hinged by a single pintel extending parallel to said seat post, the springs associated with said valve members being mounted to said single pintel.

4. The check-valve assembly of claim 1, in which said valve-seat formations establish more than two valve-seat regions in angularly sequential adjacency about the central axis of said bore, each of said valve members being generally sector-shaped and hinged by a single pintel extending tangentially with respect to the associated sector shape, the up-stop contact portion of each spring being located generally in the central plane of symmetry of each sector.

5. The check-valve assembly of claim 4, in which one spring is associated with each valve member.

6. The check-valve assembly of claim 4, in which two springs are associated with each valve member, the two springs being image duplicates of each other and in end-to-end adjacency on the same pintel, with their respective up-stop contacting portions in adjacency.

7. The check-valve assembly of claim 4, in which two springs are associated with each valve member, the two springs having equal numbers of turns and opposite directions of helical advance, said springs being located in end-to-end adjacency and being body-referenced at image offsets from the central plane of symmetry of the associated sector, and said up-stop contact portion being an integral formation of the valve-member biasing arm of at least one of said two springs.

8. A check-valve assembly, comprising an annular body with a fluid-flow passage bore extending therethrough between upstream and downstream ends of said body, said valve body having valve-seat formations including a seat post diametrically spanning the bore of said body and defining two opposed generally semicircular seat openings to share flow via said passage, hinge means carried by said body on an axis located downstream from said seat openings and parallel to said post, two valve members hinged to said body via said hinge means, said valve members having a valve-closing position in coaction with said seat formations for blocking fluid flow in the upstream direction and said valve members having a valve-open position in back-to-back relation to each other for passage of fluid flow in the downstream direction, and body-referenced spring means urging said valve members to valve-closing position, said spring means including at least one integrally formed up-stop contact portion carried by one of said valve members and positioned for yielding abutment with the other of said valve members when in said valve-open position.

9. The check-valve assembly of claim 8, in which said spring means further includes a second up-stop contact portion carried by the other of said valve members and positioned for yielding abutment with said one valve member when in said valve-open position.

10. The check-valve assembly of claim 9, in which said spring means comprises two like coil springs respectively positioned opposite on sides of the center of said hinge means, the respective up-stop contact portions being at symmetrically opposite offsets from the axial plane of the hinge center.

11. The check-valve assembly of claim 9, in which said hinge means includes a single diametrically extending pintel connecting said valve members to said body, each of said spring means including a coiled-body portion surrounding a different one of two diametrically opposed regions of said pintel.

12. The check-valve assembly of claim 11, in which the pintel connection to said body is at the opposite ends of said pintel.

* * * * *